United States Patent [19]

Capelle

[11] Patent Number: 4,629,327
[45] Date of Patent: Dec. 16, 1986

[54] PIN-BARREL EXTRUDER HAVING ADJUSTABLE PINS

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 754,159

[22] Filed: Jul. 12, 1985

[30] Foreign Application Priority Data

Feb. 6, 1985 [DE] Fed. Rep. of Germany ....... 3502910

[51] Int. Cl.$^4$ .......................... B29B 1/06; B01F 7/08
[52] U.S. Cl. ...................................... 366/80; 366/90; 366/307; 366/322
[58] Field of Search .................. 366/80, 90, 307, 322, 366/324; 100/150; 425/207, 208, 209

[56] References Cited

U.S. PATENT DOCUMENTS

| | | | |
|---|---|---|---|
| 3,169,752 | 2/1965 | De Laubarede | 366/80 |
| 4,178,104 | 12/1979 | Menges et al. | 366/80 |
| 4,462,691 | 7/1984 | Boguslawski | 366/80 |
| 4,581,992 | 4/1986 | Koch | 366/90 X |

Primary Examiner—Philip R. Coe
Attorney, Agent, or Firm—Schwartz, Jeffery, Schwaab, Mack, Blumenthal & Evans

[57] ABSTRACT

A pin-barrel extruder suitable for processing rubber and thermoplastic plastics materials having pin adjustment means is disclosed. The extruder comprises a barrel having a screw rotating therein. Pins project radially inwardly into the hollow interior of the barrel. These pins are distributed both uniformly around the periphery of the barrel and in axial alignment with one another. Axially aligned pins are made adjustable, with regard to their depth of penetration into the barrel by being connected to a bar or rail. This bar or rail is disposed radially outwardly of the barrel but extends parallel to the axis thereof. Actuating means are provided for displacing the bar or rail, and hence the pins, relative to the barrel.

3 Claims, 4 Drawing Figures

PIN-BARREL EXTRUDER HAVING ADJUSTABLE PINS

FIELD OF THE INVENTION

The present invention relates to a pin-barrel extruder. More particularly, it relates to an extruder in which the pins are adjustable.

BACKGROUND OF THE INVENTION AND PRIOR ART DISCUSSION

Pin-barrel extruders are known and comprise a screw conveyor which is rotatable in the hollow interior of a barrel. Disposed along the length of the barrel and projecting radially into the hollow interior of the barrel are a plurality of pins. These pins project to adjacent the core of the screw, the flight or flights on the screw being discontinuous in the region of the pins.

It is desirable if the depth of penetration of the pins into the barrel is adjustable. Such an arrangement is disclosed in U.S. Pat. No. 4,178,104. In such arrangement the pins are screw-fitted in holding members and are non-rotatably connected thereto by means of lock nuts. The holding fixtures are radially displaceable in guide members mounted on the extruder cylinder. A gear member is used for adjustment purposes. One face of the gear faces the holding fixture and is provided with a cam track. The track engages corresponding complementary cam-followers on the holding fixtures. The gear member is driven by a pinion, is freely rotatable and is prevented from axial movement by a collar ring.

However, such an arrangement suffers from numerous disadvantages. In setting up such an arrangement, the gear member must firstly be positioned over the extruder barrel. In its end position, it then has to be mounted on a sleeve-like guide means which, in turn, has to be screw-connected to the extruder barrel. Finally, complementary cams and cam tracks have to be provided laterally on the gear member and in the holding fixtures. This is time-consuming and costly.

In addition, an extremely elaborate construction is also required, for the mounting of the drive pinion which engages with the gear on the extruder cylinder. This adds to the costs associated with the production of an extruder having such an adjustment arrangement.

It is also difficult to assemble the adjusting means. Before a barrel flange connecting member, which is usually provided to permit barrel portions to be connected together, is welded to one end of a barrel portion, it is necessary for the sleeve-like guide member to be slid onto the barrel so as to receive the bearings for the gear. The gear is then positioned over the cylinder and brought into its intended position. Only after this has been done can the guide member be screw-connected to the extruder barrel. The holding fixture, which is provided with the lateral cam followers, is then slid onto the extruder barrel into its intended position. The individual pins are screwed radially inwardly through the holding fixture. Only when the assembly of all of these integers has been completed, can the barrel flange be welded to the end of the barrel portion.

After a period of time, it is likely that the cam followers on the holding fixture and the cam track on the gear member will exhibit signs of wear. To replace them, the above-described procedure must be reversed. So much work is involved that it is simpler to replace the entire barrel portion. Moreover, it is also necessary to extract the screw from the extruder, and to remove the barrel flange connection. These measures which need to be taken mean that the extruder is inoperative for long, and therefore costly, periods of time.

OBJECTS OF THE INVENTION

It is an object of the present invention to provide a pin-barrel extruder in which the pins are adjustable but in which the adjusting means are of a very simple construction and require little assembly and dismantling. In particular, it is an object of the invention to avoid the necessity for extracting the screw of the extruder and for disconnecting, by removing the weld, the flanges of the individual barrel portions when it is desired to change or replace the means for adjusting the pins.

SUMMARY OF THE INVENTION

According to the present invention there is provided a pin-barrel extruder suitable for processing rubber, thermoplastics materials and the like, comprising hollow cylindrical barrel means, said barrel means comprising a radially inner surface and a radially outer surface, screw means rotatable in said hollow cylindrical barrel means, said screw means comprising a core portion and at least one flight portion helically disposed around said core portion, said at least one flight portion being discontinuous, said barrel means defining radially directed throughbores extending from said radially outer surface to said radially inner surface, said throughbores being distributed both around the periphery of said barrel at substantially uniform intervals and in axially aligned rows along the length of said barrel, pin means disposed in said throughbores, each said pin means defining first and second end regions, said first end region being directed radially inwardly towards the longitudinal axis of said core of said screw means and projecting into said hollow cylindrical barrel means to adjacent said core through said discontinuous portions of said at least one flight, and adjusting means for adjusting the depth of penetration of said pin means into said hollow cylindrical barrel means acting on said second end region of said pins wherein said adjusting means comprises rail or bar means detachably affixed to said second end region of at least two said pins in a said axially aligned row with said rail or bar means being disposed radially outwardly of said radially outer surface of said extruder barrel and extending parallel to the longitudinal axis of the barrel and actuating means for said adjustment means acting on said bar or rail means to cause said bar or rail means to be displaced relative to said barrel in the direction of the longitudinal axis of said pins detachably affixed thereto.

In such an arrangement, the provision of the bar or rail to which at least two, and possibly more, pins are detachably affixed makes it possible for the plurality of pins to be moved simultaneously simply by operating the adjusting means which displaces the bar with respect to the barrel. The technical outlay required to provide the means for producing such movement is relatively small, and the pins are moved rapidly into their desired position.

Preferably, said actuating means comprise hydraulic piston and cylinder arrangements, each said arrangement comprising cylinder means and piston rod means slidable in said cylinder means, one of said cylinder means and said piston rod means being fixedly mounted on said bar or rail means and the other of said cylinder means and said piston rod means being fixedly mounted on said barrel means.

Alternatively, the adjusting means may be of a mechanical, rather than a hydraulic, nature.

Thus, in an alternative preferred embodiment said bar or rail means define threaded bores and wherein said actuating means comprise threaded spindles disposed in said threaded bores in said bar or rail means, worm gear means engaging said spindles and drive means driving said worm gear means.

Such an arrangement still makes it possible for the depth of penetration of a row or line of pins extending parallel to the central longitudinal axis of the extruder barrel to be achieved. This is effected simply by actuation of the worm gear.

In all of these arrangements, the pin adjustment means can be simply affixed to the extruder barrel without the need for dismantling the extruder barrel portions or for the screw to be extracted from the barrel. Even if wear phenomena or a fault occurs in the adjustment means, replacement of the appropriate adjustment means can be effected without interrupting the operating of the extruder.

Such arrangements also make it possible for the extruder to be adapted quickly and easily for treating materials having different viscosities and requiring different processing temperatures.

BRIEF DESCRIPTION OF THE DRAWINGS

Embodiments of the present invention will be further described, by way of example, with reference to the accompanying drawings, in which.

DESCRIPTION OF PREFERRED
EMBODIMENTS

Figure 1:
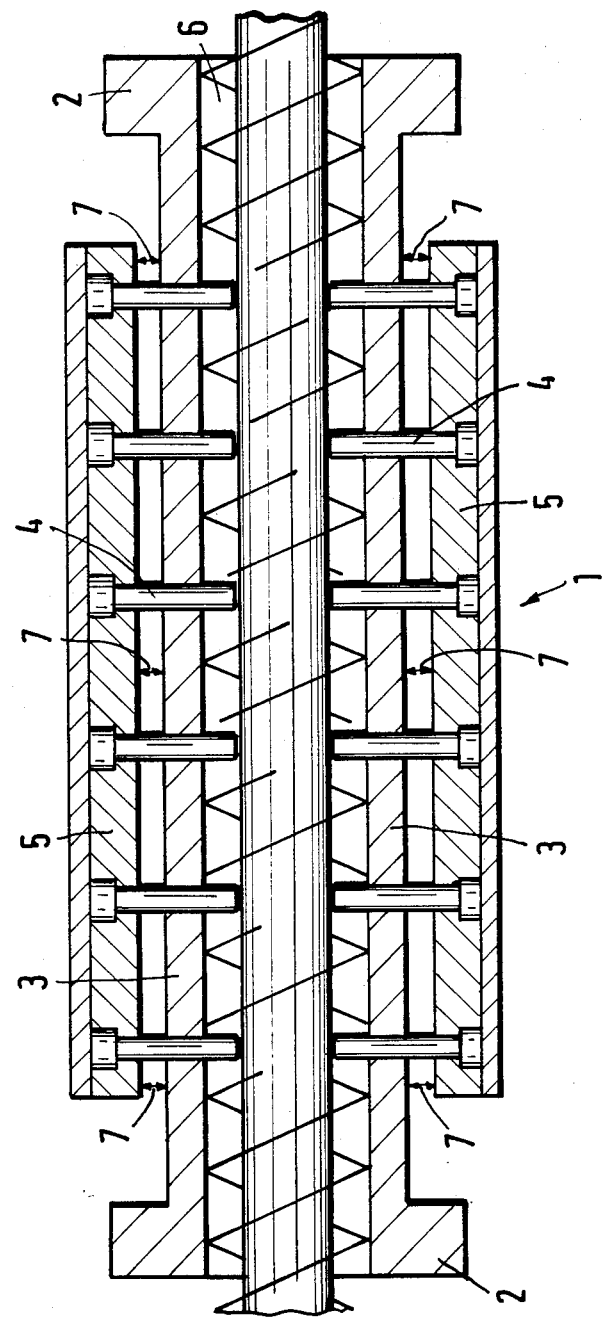
FIG. 1 is a schematic, longitudinal sectional view through a portion of a pin-barrel extruder and shows, purely schematically, means for adjusting the pins.

In FIG. 1, there is shown a pin-barrel extruder which is generally referenced 1. A screw (shown, but not referenced) rotates within a hollow cylindrical barrel 3. The screw comprises a central core having one or more helical flights disposed thereon. The or each flight is discontinuous so as to permit pins 4 to project through throughbores in the barrel 3 to adjacent the screw core. Such pins therefore project radially into the interior 6 of the barrel 3. At each of its ends, the barrel portion 3 is provided with flanges 2 so that a plurality of barrel portions can be interconnected to increase the overall length of the extruder. Such an arrangement is known in the art.

However, in the present invention, the radially outer ends of the pins 4 are detachably affixed to a bar or rail 5. A plurality of such bars or rails 5 may be provided and the radially outer ends of at least two pins 4 are affixed to each bar 5. Each bar extends substantially parallel to the longitudinal central axis of the barrel 3.

Means schematically referenced 7 in FIG. 1 are provided to provide relative movement between the bars 5 and the extruder barrel so that the pins 4, which are secured to the bar 5, can be inserted into and retracted from the interior 6 of the barrel 3 through the throughbores formed in the barrel. It is particularly desirable to ensure that the desired depth of penetration of the pins 4 into the barrel interior 6 can be achieved smoothly, that is to say, not in a step-wise manner.

The means for adjusting the depth of penetration may be in the form of hydraulic or pneumatic cylinders which are mounted between the bar 5 and the outer surface of the barrel 3.

Figure 2:
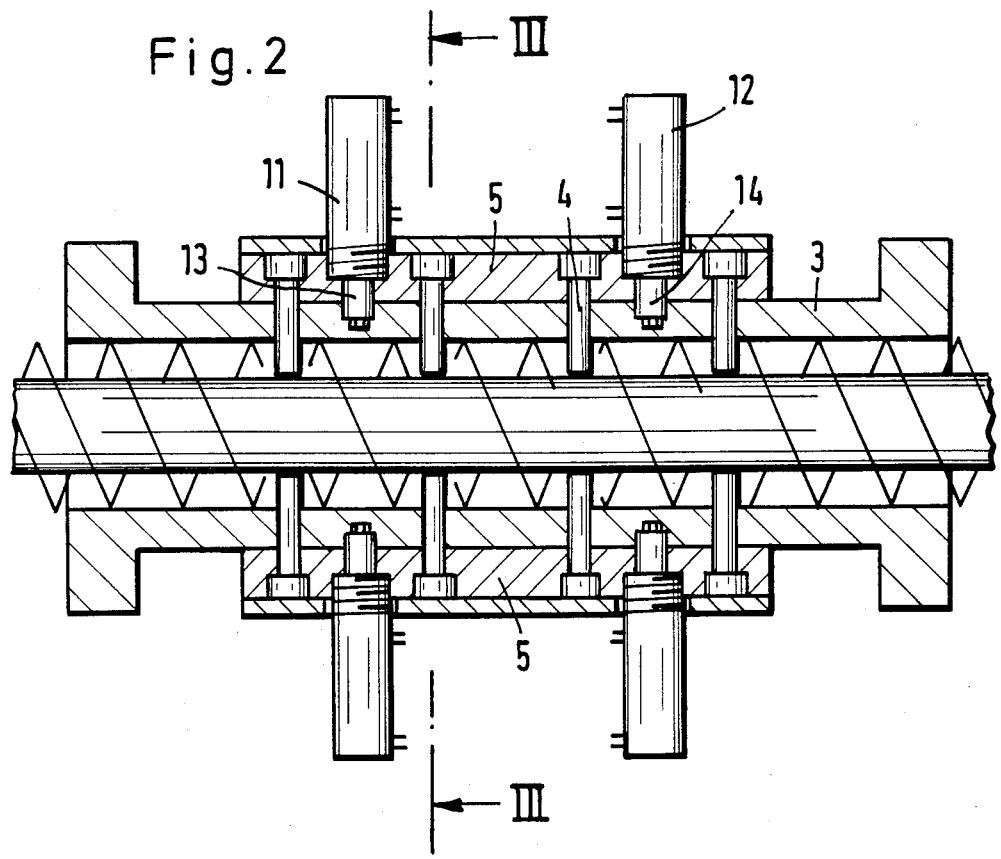
FIG. 2 is a view similar to FIG. 1 of a slightly modified pin-barrel extruder and shows, somewhat schematically, one type of pin adjustment means.

In the arrangement shown in FIG. 2, the bar 5 is made movable in the direction of the longitudinal axes of the pins 4 attached thereto by means of hydraulic piston and cylinder arrangements. By so doing, the pins 4 which are detachably affixed to the bar 5 can be moved into or out of the interior 6 of the barrel 3.

The piston rods 13 and 14 of the piston and cylinder arrangements are extended through bores formed in the bar 5 and are both supported on and secured to the extruder barrel. The hydraulic cylinders 11 and 12 of the arrangements are connected to the bar 5.

Figure 3:
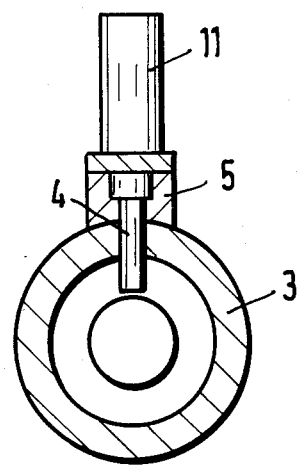
FIG. 3 is a cross-sectional view taken along the line III—III of FIG. 2.

In the cross-sectional view shown in FIG. 3, only one pin 4 with an adjusting means is visible. However, pins 4 may be provided at angular intervals of 45°, 90° or 120° around the periphery of the barrel, such pins 4 penetrating into the interior 6 thereof. A number of pin planes may be provided along the length of the barrel 3.

Figure 4:
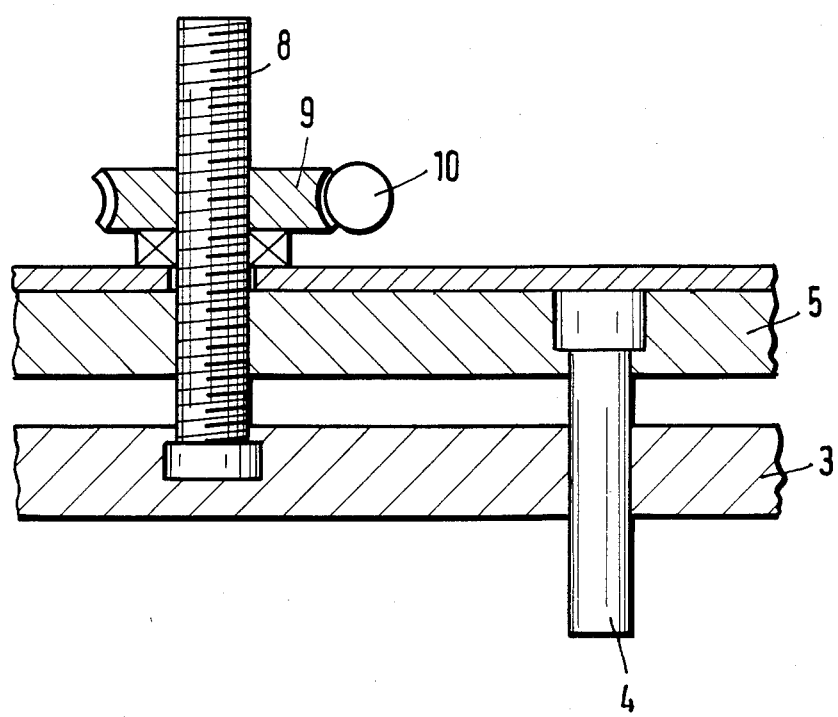
FIG. 4 shows a detail of an extruder of the general type shown in FIG. 1 but having an alternative type of pin adjustment means.

Alternatively, mechanical means may also be used for adjusting the location of the bar 5 and hence the depth of penetration of the pins 4 into the barrel interior 6. Thus, as shown in FIG. 4, threaded spindles 8 may be provided which are screwed into bores formed in the bar 5. The spindles 8 engage with a worm gear 9 and are set in rotational movement by means of a driven shaft 10 acting on the gear 9. The spindle 8 is affixed to the barrel 3 and, in consequence, displacement of the spindle 8 causes movement of the bar 5 relative to the barrel 3. This, in turn, alters the depth of penetration of the pins 4 into the barrel interior 6.

I claim:

1. A pin-barrel extruder suitable for processing rubber, thermoplastics materials and the like, comprising hollow cylindrical barrel means, said barrel means comprising a radially inner surface and a radially outer surface, screw means rotatable in said hollow cylindrical barrel means, said screw means comprising a core portion and at least one flight portion helically disposed around said core portion, said at least one flight portion being discontinuous, said barrel means defining radially directed throughbores extending from said radially outer surface to said radially inner surface, said throughbores being distributed both around the periphery of said barrel at substantially uniform intervals and in axially aligned rows along the length of said barrel, pin means disposed in said throughbores, each said pin means defining first and second end regions, said first end region being directed radially inwardly towards the longitudinal axis of said core of said screw means and projecting into said hollow cylindrical barrel means to adjacent said core through said discontinuous portions of said at least one flight, and adjusting means for adjusting the depth of penetration of said pin means into said hollow cylindrical barrel means acting on said second end region of said pins wherein said adjusting means comprises rail or bar means detachably affixed to said second end region of at least two said pins in a said axially aligned row with said rail or bar means being disposed radially outwardly of said radially outer surface of said extruder barrel and extending parallel to the longitudinal axis of the barrel and actuating means for said adjustment means acting on said bar or rail means to cause said bar or rail means to be displaced relative to said barrel in the direction of the longitudinal axis of said pins detachably affixed thereto.

2. A pin-barrel extruder as recited in claim 1, wherein said actuating means comprise hydraulic piston and cylinder arrangements each said arrangement comprising cylinder means and piston rod means slidable in said cylinder means, one of said cylinder means and said piston rod means being fixedly mounted on said bar or rail means and the other of said cylinder means and said piston rod means being fixedly mounted on said barrel means.

3. A pin-barrel extruder as recited in claim 1, wherein said bar or rail means define threaded bores and wherein said actuating means comprise threaded spindles disposed in said threaded bores in said bar or rail means, worm gear means engaging said spindles and drive means driving said worm gear means.

* * * * *